United States Patent
Dufourd et al.

(10) Patent No.: US 8,421,806 B2
(45) Date of Patent: Apr. 16, 2013

(54) METHOD OF OPTIMIZING RENDERING OF A MULTIMEDIA SCENE, AND THE CORRESPONDING PROGRAM, SIGNAL, DATA CARRIER, TERMINAL AND RECEPTION METHOD

(75) Inventors: Jean-Claude Dufourd, Le Kremlin Bicetre (FR); Christophe Michel, Chantepie (FR); Arnaud Caigniet, Rennes (FR)

(73) Assignee: Streamezzo, Paris (FR)

( * ) Notice: Subject to any disclaimer, the term of this patent is extended or adjusted under 35 U.S.C. 154(b) by 776 days.

(21) Appl. No.: 12/092,494

(22) PCT Filed: Oct. 30, 2006

(86) PCT No.: PCT/EP2006/067948
§ 371 (c)(1),
(2), (4) Date: Oct. 13, 2008

(87) PCT Pub. No.: WO2007/051784
PCT Pub. Date: May 10, 2007

(65) Prior Publication Data
US 2009/0079735 A1 Mar. 26, 2009

(30) Foreign Application Priority Data
Nov. 2, 2005 (FR) ...................................... 05 11177

(51) Int. Cl.
*G06T 13/00* (2011.01)
*G06G 17/00* (2006.01)
*H04N 7/12* (2006.01)

(52) U.S. Cl.
USPC .. 345/473; 345/418; 375/240.01; 375/240.08

(58) Field of Classification Search .......... 345/418–420, 345/581, 473–475; 375/240.01–240.09, 375/240.1, 240.11–240.19, 240.2, 240.21–240.29
See application file for complete search history.

(56) References Cited

U.S. PATENT DOCUMENTS

| | | | | |
|---|---|---|---|---|
| 5,777,621 A | * | 7/1998 | Schneider et al. | 345/428 |
| 5,925,104 A | * | 7/1999 | Elbers et al. | 709/231 |
| 6,072,498 A | * | 6/2000 | Brittain et al. | 345/428 |
| 6,232,974 B1 | * | 5/2001 | Horvitz et al. | 345/419 |

(Continued)

FOREIGN PATENT DOCUMENTS

| | | |
|---|---|---|
| CN | 1215282 A | 4/1999 |
| EP | 0 910 219 A | 4/1999 |
| WO | WO 98/46006 A | 10/1998 |

OTHER PUBLICATIONS

Chinese Office Action Summary from application No. 200680048787.2 mailed on Apr. 30, 2010.

(Continued)

*Primary Examiner* — Ke Xiao
*Assistant Examiner* — Andrew Shin
(74) *Attorney, Agent, or Firm* — Zilka-Kotab, PC

(57) ABSTRACT

A method is provided for describing a multimedia scene comprising a set of objects that can be animated. This method provides at least one item of information of optimization, provided for permitting, in a terminal, a selection of a scene rendering algorithm among a set of at least two available algorithms according to at least one criterion of optimization of an allocation of resources used for carrying out the scene rendering algorithm.

18 Claims, 2 Drawing Sheets

U.S. PATENT DOCUMENTS

| | | | |
|---|---|---|---|
| 6,400,372 B1 * | 6/2002 | Gossweiler et al. | 345/619 |
| 2001/0055341 A1 | 12/2001 | Hermann et al. | 375/240.25 |
| 2002/0024952 A1 | 2/2002 | Negishi et al. | 370/394 |
| 2002/0083032 A1 * | 6/2002 | Bourges-Sevenier | 707/1 |
| 2002/0129080 A1 * | 9/2002 | Hentschel et al. | 709/102 |
| 2003/0222883 A1 * | 12/2003 | Deniau et al. | 345/582 |
| 2004/0167916 A1 * | 8/2004 | Basso et al. | 707/100 |
| 2007/0005795 A1 * | 1/2007 | Gonzalez | 709/232 |
| 2009/0003389 A1 * | 1/2009 | Joung et al. | 370/509 |

OTHER PUBLICATIONS

XP002394535 Jean-Claude Dufourd, Young Kwon Lim, "Laser and SAF Editor's Study," Jul. 2005.

International Preliminary Report on Patentability from counterpart foreign Application No. PCT/EP2006/067948.

International Search Report from International Application No. 12/092,494 mailed Feb. 22, 2007.

* cited by examiner

METHOD OF OPTIMIZING RENDERING OF A MULTIMEDIA SCENE, AND THE CORRESPONDING PROGRAM, SIGNAL, DATA CARRIER, TERMINAL AND RECEPTION METHOD

CROSS-REFERENCE TO RELATED APPLICATIONS

This Application is a Section 371 National Stage Application of International Application No. PCT/EP2006/067948, filed Oct. 31, 2006 published as WO 2007/051784 on May 10, 2007, not in English.

FIELD OF THE DISCLOSURE

The field of the disclosure is that of the transmission of multimedia data to a terminal and more precisely multimedia for representing scenes, able to be modified interactively subsequently to the loading of the initial scene into the rendering terminal.

A particular application of the disclosure concerns in particular and not exclusively the rendering of multimedia data by radio communication devices such as mobile telephones for example, which provide to the user, according to the model and generation, various services with interactive content (in particular the "mobile internet", WAP, from "Wireless Application Protocol"), the capacities and enhancement of which are often limited by the available memory resources and power.

More precisely, the disclosure is situated in the context of improvement to the fluidity of such multimedia services where the level of interactivity and the complexity may vary over time.

BACKGROUND OF THE DISCLOSURE

1. Interactivity of a Multimedia Scene

In various applications such as the internet for example, a multimedia scene is composed of graphical objects and displayed on a screen by the use of a graphical interface. The screen may undergo dynamic modifications interactively, after it is fully downloaded by the rendering terminal. Several types of interaction may modify a multimedia scene:
  the execution of scripts or programs triggering the animation of an object in the scene, following an event generated by the user, such as a mouse click on an object containing an interactive link to a page of the internet for example;
  automatic updating coming from the server on which the characteristics of the scene to be transmitted are stored.

In general, any animation or change of form in the scene, generated by a user, corresponds to an interaction on the objects: translation, appearance, disappearance, highlighting, change of properties, etc.

The diversity and complexity of these interactions and of the modifications that they give rise to depend on the service and the application in which the multimedia scene is executed.

2. Coding of a Multimedia Scene

An interactive multimedia scene is described and coded according to a format managing graphical and interactive functionalities thus allowing visual returns and a graphical rendering that are very attractive to the user.

In addition, while many standard graphical formats are static, in the sense that they describe scenes that are not modified over time, new formats, such as the standardized LASER format, allow almost unlimited interactions on graphical scenes.

For this purpose a multimedia scene is broken down into graphical objects, each containing attributes taking numerical values, sometimes predefined. It is possible in particular to count among these attributes elements concerning the animation of the objects making up the interactive scene.

3. Rendering of a Multimedia Scene

An interactive multimedia graphical scene can be executed in the context of various services and applications, offered both by sophisticated devices such as a computer having powerful components (graphics card, high-speed network connection, etc), and devices more restricted in resources, such as wireless telecommunication systems.

Conventionally, for rendering an interactive scene, the multimedia reader of the terminal then uses, according to known techniques, a program module called a rendering engine.

Its role is to produce the rendering of a synthetic image, from the scene description, by calculating all the surfaces of the various objects making up the graphical object scene.

The rendering engine then explores all the characteristics and attributes of the objects making up the scene, in particular the attributes defining its animations. It functions in at least one rendering mode that is in a position to manage a very complex scene. It is also responsible for executing the modifications of the scene when the user interacts with at least one of its interactive components.

In general, a multimedia reader may have available several operating modes, including at least one complete mode and at least one "simplified" mode, faster, but not capable of managing the full complexity of the standard.

When there is no protocol for dynamic modification of the scene, the rendering engine is capable, during the exploration of the scene, to choose the most appropriate rendering mode, the most simple, which can however satisfy all the rendering options. The choice of the most appropriate rendering mode must be made at the start of the rendering and cannot be called into question later. It is a difficult choice that determines the rendering of the scene throughout its duration.

When a protocol for dynamic modification of the scene is available, the rendering engine is no longer capable of making these analyses and these rendering mode choices: this is because, at any time, a dynamic modification may call into question the choice of simple rendering mode by adding a parameter that requires a more complex rendering mode. However, as the choice of the rendering mode must be made once and for all at the start, the rendering engine can, as the only solution, merely apply the most general and the most complex rendering mode.

Systematically, in the presence of a dynamic scene modification protocol, the content of the "animation" element must be loaded into a different scene from the initial scene. The rendering engine must therefore be capable of rendering two independent scenes, which results conventionally in an increase in complexity in terms of implementation.

4. Drawbacks of the Prior Art

Conventionally, in the rendering technique known from the prior art, the rendering engine has no means enabling it to determine in advance the level of complexity of a scene, that is to say knowing whether the latter will be caused to undergo interactive modifications on at least some objects in the multimedia scene. Such modifications require changing to a more complex rendering mode, even if the analysis of the initial scene allowed it to be assumed that a lighter and simpler rendering mode would offer better use of the resources of the terminal.

However, the inventors have found that a major part of the services or applications implement and execute interactive scenes with a low level of complexity, in terms of interaction and/or multimedia rendering, which do not require the use of the most general rendering mode, the most expensive in terms of resources.

Since the rendering engine does not know in advance the content of the scene received, it is therefore not in a position to make substantial simplifications affording a saving in resources, both in terms of calculation time or downloading, which would however be advantageous in the case of devices or terminals, for example radio communication ones, having available small calculation resources, or at the very least limited ones.

In other words, a multimedia reader, even if it has several operating modes available, is incapable of ensuring that a simplified operating mode may prove to be adequate in terms of multimedia rendering, before having received all the scene to be rendered.

In the absence of information, the reader can then only make a choice of security by choosing a complex operating mode, in order to provide all the dynamic modifications of the scene that may occur subsequently.

Another drawback of current techniques is related to the fact that they cause a relatively slow functioning of the rendering engine.

Moreover, an additional drawback of multimedia scene rendering techniques stems from the fact that there exists no specification concerning the optimization of the rendering of interactive multimedia scenes on terminals, for example radio communication terminals.

Finally, up to the present time, this problem did not exist in the descriptions of scenes relying on the SVG, SMIL, HTML, etc standards, which include no possibility of dynamic modifications of scenes that may arise after the loading of the initial scene.

This is because, in SVG/SMIL in particular, the "initial" scene represents the entire scene. The SVG/SMIL multimedia reader must examine the whole of the scene before beginning to retrieve it through the graphical interface of a terminal and therefore before making all the optimizations and simplifications that it judges adequate for this.

Moreover, in SVG, the text-rendering, image-rendering, shape-rendering and color-rendering attributes indicate to the rendering engine whether it should prefer a smooth rendering mode, which would have the drawback of being slow, or fast. In the latter case, the rendering will be degraded.

SUMMARY

An aspect of the disclosure relates to a method of describing a multimedia scene comprising a set of objects that can be animated.

According to an embodiment of the invention, such a method uses at least one item of optimization information, intended to allow, in a terminal, a selection of a scene rendering algorithm from a set of at least two available algorithms, according to at least one criterion for optimization of an allocation of resources used for implementing said scene rendering algorithm.

Thus an embodiment of the invention is based on an entirely novel and inventive approach of transmitting a scene to a terminal that is to render it, taking account of at least one item of optimization information associated with the file describing the scene, with the objective of choosing the most appropriate particular algorithm for rendering the scene in an optimal fashion, and/or minimizing and/or optimizing the potential resources of the terminal. This is because, according to an embodiment of the invention, the terminal that is to receive the scene has a choice of algorithms, each having specific advantages in terms of scene rendering optimization: a first algorithm may for example be faster by reducing the precision and therefore the quantity of calculations necessary for rendering, a second algorithm for its part may make it possible to optimize the rendering of an object in three dimensions by transforming it into an object in only two dimensions, a third algorithm may also allow a fine rendering only of certain objects in the scene, etc.

Each algorithm therefore has specific characteristics and advantages. The designer of the service or of the application in which the scene will be rendered is in a position to define how to optimize this rendering, and he knows in particular if it can be simplified or accelerated, if it is necessary to render the entire scene and its interactivities, etc. He may then insert optimization information intended for the terminal that will enable the latter to choose the corresponding rendering algorithm.

By virtue of this information, the rendering device is capable of adapting the operating mode of its rendering engine in particular according to the performance of the service used.

In addition, the consequence of the presence of such optimization information is to enable the rendering engine to use memory representations of small size, and fast rendering algorithms, which is advantageous for rendering devices with limited hardware and software resources such as mobile telephones.

Advantageously, at least one of the items of optimization information according to an embodiment of the invention allows parameterizing in the terminal of at least one characteristic of a selected scene rendering algorithm.

In other words, once the rendering algorithm is selected, the optimization information makes it possible to adapt the latter, for example by modifying certain parameters used in the algorithm, in order to optimize the rendering of the scene in an even more refined manner. Thus the optimization information offers additional flexibility.

Advantageously, in a first embodiment, at least one of the said items of optimization information is inserted as a preamble to the scene and applies to the entire scene.

Thus, in this embodiment of the invention, the optimization information concerns the entire scene. This information is inserted judiciously before the useful data, so that the scene rendering device can choose the rendering algorithm as soon as the multimedia scene is received.

In a second embodiment, at least one of the items of optimization information applies to at least one particular object of the scene.

This is because it may be necessary to optimize only part of the multimedia scene. In this case, according to an embodiment of the invention, the optimization information concerns only one or more specific objects of the scene, the rendering of which is to be optimized.

Advantageously, in a particular embodiment of the invention, the information is binary information, corresponding to two complexity levels known as "simple" and "complex".

In other words, additional information is transmitted with the interactive multimedia scene, enabling the multimedia reader to know whether the scene to be rendered requires simple or complex functioning of the rendering engine.

In a second particular embodiment of the invention, the information is numerical information, corresponding to gradual complexity.

In this embodiment of the invention, the optimization information thus represents several complexity levels relating to the operating mode of the rendering engine of the rendering terminal, which may be graduated in a gradual manner in particular.

Advantageously, a scene is said to be "complex" at least when it uses a temporal rendering control of at least one object.

In general terms, this is effective when an object of the scene changes over time.

In a particular embodiment, said scene is coded in SVG/LASeR.

In a particular embodiment of the invention, one of said items of optimization information is information on the characteristics of inclusion in said scene of at least part of another scene, the information being intended for a scene rendering engine of the terminal.

In particular, when a principal interactive scene makes reference to a second multimedia scene by an interactive link for example, knowledge of the optimization level of the principal scene enables a rendering engine to act as if the referenced scene was simply included in the principal scene.

An embodiment of the invention also concerns a computer program product that can be downloaded from a communication network and/or stored on a support that can be read by a computer and/or is executable by a microprocessor, comprising program code instructions for implementing the method as described previously.

An embodiment of the invention also concerns a signal describing a multimedia scene comprising a set of objects that can be animated. According to the invention, such a signal comprises optimization information, intended to allow, in a terminal, selection of a scene rendering algorithm among a set of at least two available algorithms, according to at least one criterion of optimization of an allocation of resources used for implementing said scene rendering algorithm.

An embodiment of the invention also concerns a data carrier carrying at least one signal describing a multimedia scene. According to the invention, such a data carrier comprises a set of objects that can be animated. At least one of the signals comprises optimization information intended to allow, in a terminal, selection of a scene rendering algorithm from a set of at least two available algorithms, according to at least one criterion for optimization of an allocation of resources used for implementing the scene rendering algorithm.

An embodiment of the invention also concerns a radio communication terminal comprising means of rendering a multimedia scene comprising a set of objects that can be animated. According to the invention, such a terminal comprises means of reading optimization information, intended to allow, in a terminal, selection of a scene rendering algorithm from a set of at least two available algorithms, according to at least one criterion for optimization of an allocation of resources used for implementing said scene rendering algorithm.

An embodiment of the invention also concerns a method of receiving a multimedia scene comprising a set of objects that can be animated, in a terminal. According to an embodiment of the invention, such a method comprises the following steps:

reading at least one item of optimization information;
controlling the capacities of the terminal and selecting a scene rendering algorithm from a set of at least two available algorithms according to at least one criterion for optimization of an allocation of resources used for implementing said scene rendering algorithm.

Finally, an embodiment of the invention concerns a computer program product that can be downloaded from a communication network and/or stored on a carrier that can be read by a computer and/or is executable by a microprocessor, comprising program code instructions for implementing the reception method as described previously.

BRIEF DESCRIPTION OF THE DRAWINGS

Other characteristics and advantages will emerge more clearly from a reading of the following description of a preferential embodiment, given by way of simple illustrative and non-limitative example, and the accompanying drawings, among which.

DETAILED DESCRIPTION OF ILLUSTRATIVE EMBODIMENTS

1. General Principle

The general principle of an embodiment of the invention is based on a method of describing a multimedia scene comprising optimization information, which allows judicious choice for the rendering device and use of a particular rendering algorithm.

It should be noted that the rendering is the infographic method that consists of animating a multimedia scene. The rendering engine can in particular be caused to manage animations of the "flash" type, digital films, etc.

The aim of an embodiment of the invention is the indication of information for optimization of rendering respected by a scene that must be updated over time.

Figure 1:
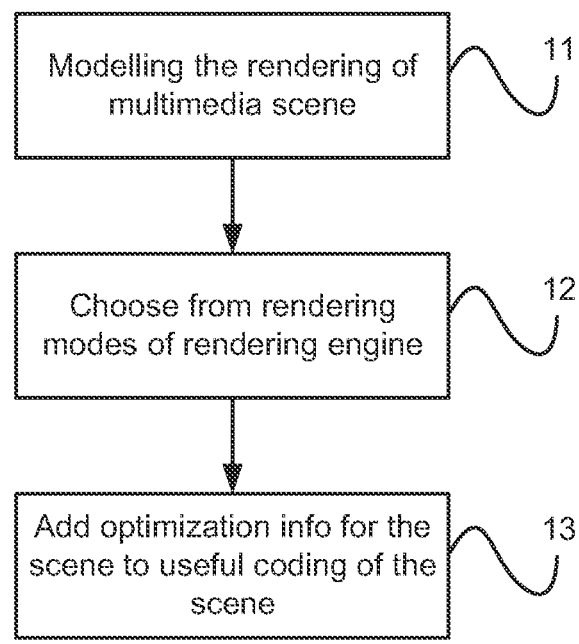
FIG. 1 shows schematically the general principle of the method according to an embodiment of the invention.

In relation to FIG. 1, the general principle of modelling of an interactive multimedia scene according to an embodiment of the invention is presented.

An author designs an interactive service containing multimedia scenes with a variable complexity level.

Thus a first step 11 for the author consists first of all of the modelling of the rendering of a multimedia scene.

Following the modelling of the service and therefore the design of the associated interactive multimedia scene the author knows whether the content of the service is complex and therefore whether the rendering of the graphical scenes requires a complete mode of the multimedia reader, so as to cover the entire multimedia standard, or whether the content of the service is simple, then requiring only a simplified operating mode of the multimedia reader.

The author is therefore in a position to choose, in a second step 12 of the design of the service according to an embodiment of the invention, among the more or less sophisticated rendering modes of the rendering engine that is used by the multimedia reader, which is or are the most adapted to the rendering of the contents produced by the service.

In a more complex embodiment of the invention, the choice of optimal rendering mode can be made differently on each content produced, and not necessarily only on the service, in order to increase the optimization even more significantly.

Thus, judiciously according to an embodiment of the invention, the author will add, to the useful data coding the scene, in a step 13 of enhancement of the description of the scene, optimization information for the scene. The terminal will then, from this optimization information, be able to choose a particular rendering algorithm from several, the most adapted in terms of quality and speed, for display on the screen of the scene for example.

Figure 2:
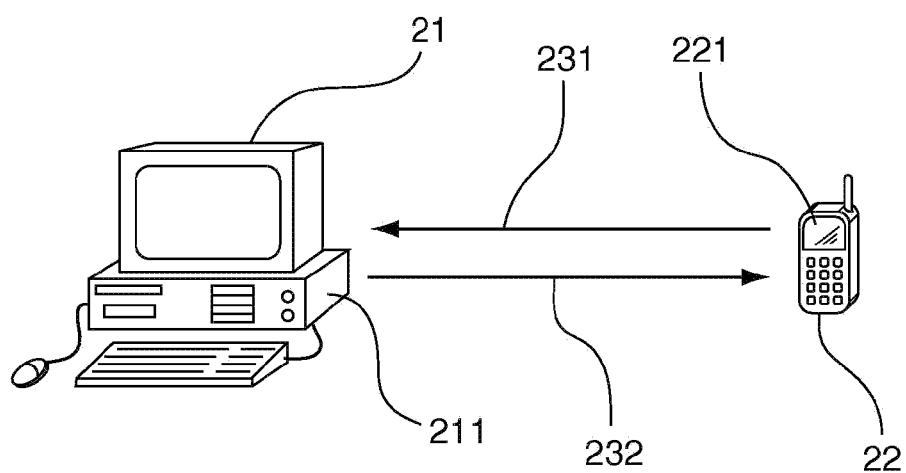
FIG. 2 illustrates a radio communication system implementing an embodiment of the invention.

FIG. 2 gives an example of a device for which an embodiment of the invention applies.

A server 21 contains in memory on its hard disk 211 for example a part of a program developing an interactive multimedia service modelled according to the method of an embodiment of the invention described in relation to FIG. 1. This service is modelled according to a graphical animation description language.

A radio communication terminal 22 needs to access this service in order to render it for a user on the screen 221. It then sends to the server a service request 231.

The server then begins the transmission of the content of the service 232, programmed according to the method of an embodiment of the invention.

The multimedia reader integrated in the electronic device of the terminal then uses its rendering engine for displaying the interactive service on the screen 221 of the terminal.

By virtue of the presence of the scene optimization information, the rendering engine of the multimedia reader is immediately in a position to choose an operating mode, optimally, and in particular a rendering mode using a rendering algorithm chosen according to this optimization information.

The optimization indication is therefore a "contract" between the author of the service and the multimedia reader:
 the content of the service is designed by the author in order to comply with constraints that enable the multimedia reader to achieve optimizations with regard to the rendering of one or more multimedia scenes;
 the sending of optimization information by the author of the service to the multimedia reader enables the latter to be sure that certain functions will not be used (for example) and that a simplified rendering mode of the rendering engine can be used by a particular algorithm for the rendering of the scene, without alteration of the latter and therefore in a manner perfectly transparent for the user of the terminal.

Figure 3:
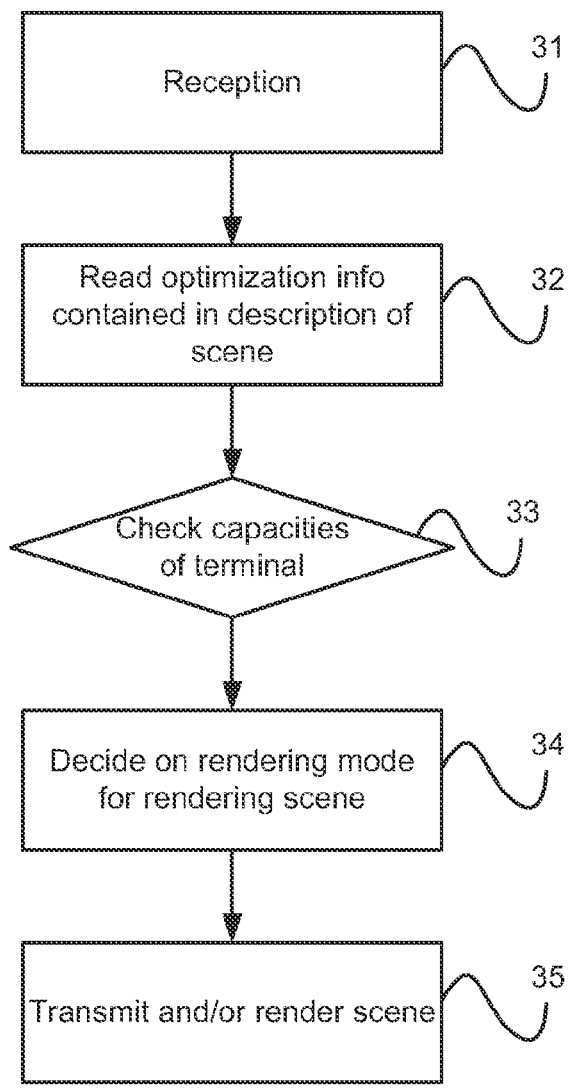
FIG. 3 is a flow diagram describing the method of reception according to an embodiment of the invention by a terminal.

The method of rendering a multimedia scene according to an embodiment of the invention is illustrated in detail in FIG. 3.

The reception 31 begins with the use of the rendering engine contained in the multimedia reader.

There then immediately follows a step 32 in which the multimedia reader reads the optimization information contained in the description of the scene to be rendered, judiciously inserted by the author when the service is designed.

Following step 32, the rendering engine then has available all the information necessary for rendering the service in an optimum fashion: it is in a position to make a compromise on the loads caused for the processor of the terminal, in terms of processing time, random access memory, etc, by choosing the most appropriate rendering algorithm.

In a particular embodiment of the invention, a check on the capacities of the terminal 33 can be made with the multimedia reader.

The rendering engine has capacities to effectively render the service, after reading and interpretation of the possible optimization associated with the description file of a multimedia scene, in which case the latter consequently decides 34 on the rendering mode, more or less rapid and complete, that it will use and possibly adapt, for rendering the scene.

The scene is then transmitted and/or rendered 35 in its entirety, by the multimedia reader.

Figure 4:
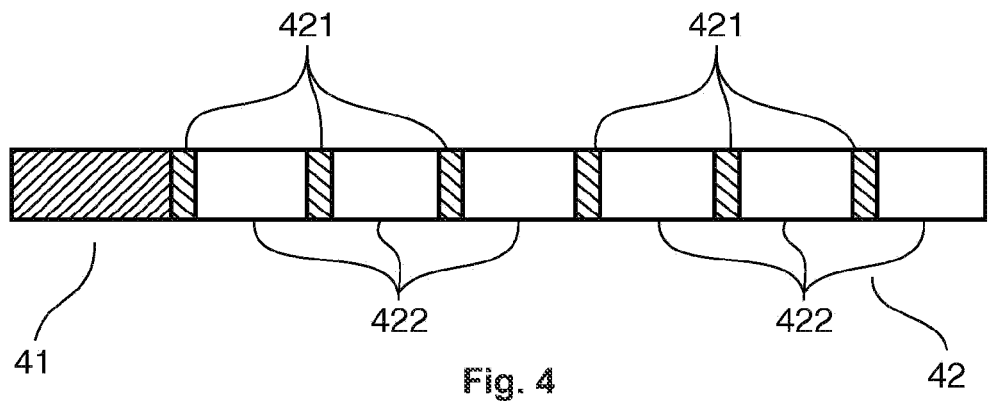
FIG. 4 depicts the structure of a multimedia scene according to an embodiment of the invention.

FIG. 4 illustrates the general structure of a scene transmitted between a server and a terminal.

It is composed of a header 41 and a set of useful data 42, which are the objects 422 of the multimedia scene.

According to an embodiment of the invention, the optimization information applicable to the entire scene or to all the objects of certain types is judiciously inserted in the header 41 of the multimedia scene so as to enable the reader to choose an operating mode as quickly as possible. This then contributes to the optimization of the rendering of the scene. The optimization information 421 applicable to certain specific objects 422 are placed in the scene, either as close as possible to the objects 422 concerned or in a manner that identifies unambiguously the objects 422 concerned.

In summary, this method of inserting optimization information for a graphical scene, as proposed by an embodiment of the invention, makes it possible advantageously to obtain a technical result of rendering of multimedia scenes less consuming in terms of hardware and/or software resources and therefore more favorable to improving the fluidity of the service offered to the user of the latter, as opposed to the known techniques of the prior art.

Advantageously, an embodiment of the invention can easily be transposed in a large number of applications that require a representation of the signals that make it up in the form of a spatio-temporal arrangement of graphical objects, with interactivity.

2. Example of Application to the SVG/LASER Format

In a particular embodiment of the invention, the method of inserting optimization information for a scene applies to the standard LASER format (from "Lightweight Application Scene Representation"), derived from the SVG standard (from "Scalable Vector Graphics"), specified in the following documents:
 "SVG specification" available at the internet address http://www.w3.org/TR/SVG12;
 ISO/IEC 14496-1-"Information technology—Coding of audio-visual objects—Part 1: Systems";
 ISO/TEC 14496-20-"Information technology—Coding of audio-visual objects—Part 20";
 Feiner, Foley, Hughes, van Dam, *Computer Graphics: Principles and Practice, second edition in C,* 1996 Addison-Wesley Publishing Company, Inc., New York.

This standard, which allows the description of interactive visual scenes, is based on a vector system: the image is then composed of geometric shapes (squares, circles, etc) inside which colors are poured. It therefore suffices for example to give the coordinates of four points and a color instead of determining all the pixels making it up.

The technique of an embodiment of the invention is described in the case where a principal multimedia scene A comprises in particular an interactive link referring to another interactive multimedia scene B.

The "animation" element of SMIL, SVG and LASeR is a mechanism of including one scene in another. In the same way that it is possible to include a colored rectangle in a scene A, it is possible to include a reference to another scene B with its graphical elements, its animations and its interactions. If this other scene B is animated or is modified dynamically over time, the problems generated between the principal scene A and the other scene B are similar to those that would be posed between a principal scene and a video, for example: synchronization, start/stop/pause of the other scene or of the video, etc. In this sense, the unfolding of time in the principal scene A and in the other scene B or the video can be synchronized or independent. The management of the general case with independent unfolding of time in the principal scene and in the other scene is more complex than in the case where the two are kept constantly synchronized. This is because, when the two unfoldings of time are kept synchronized, it is possible to make the simplifying supposition that there is only one time.

The parameters common to any element of the "animation" type are composed firstly of a group of temporal attributes ("timing" attributes):

begin: date of start of animation;
end: date of end of animation;
dur, min and max: control of duration of the animation;
and secondly of a group of synchronization attributes:
SyncBehavior;
SyncTolerance;
SyncBehaviorDefault;
SyncToleranceDefault.

In addition, it is noted that, if the service in which the multimedia scenes are executed is interactive, then these time management attributes are used, and the time in the scene B referenced by the animation-type element is not the same as in the principal scene A.

According to an embodiment of the invention, the rendering engine has available, when a multimedia scene coded according to the SVG/LASeR standard is received, information on its complexity.

In addition, the optimization information is binary, that is to say it contains two possible values, which correspond to two complexity levels, a so-called "simple" level and a so-called "complex" level.

If the case is assumed where the rendering service is not yet in a position to render the animations of the referenced scene B, the rendering engine has available, according to an embodiment of the invention, optimization information enabling it to know that the attributes concerning the animation of the objects making up the graphical scene are not used, and will never be used subsequently.

The rendering engine can consider that the rendering time will always be the same in the principal scene A and in the other referenced scene B. In this case, everything then happens as if the objects in the referenced scene B were simply inserted in the principal scene A in place of the animation element.

This then makes it possible to simplify the process of rendering of the "animation" element, which can be achieved, according to a particular embodiment, in two steps, broken down as follows:

The pointed-to scene B is inserted simply in the "animation" element as if it were only a simple "grouping" element.
The rendering terminal must simply avoid duplicates of identifiers of elements occurring during insertion.

In other words, the terminal receives an "animation" element with the optimization information according to which the time in the referenced scene B will always be the same as in the principal scene A (since the rendering service used does not retrieve the animations).

The "animation" element is then replaced in the rendering tree by a "g" (group) element C. The scene tree of the scene B is inserted in C. The mode of insertion of B in C is similar to that of a LASeR insertion command, except that the identifiers of the scene B are modified so as to avoid any doublet with the identifiers of the scene A.

This processing mode enables a multimedia reader capable of rendering a single scene to render also the simple "animation" elements, while the general mode requires a multimedia reader capable of rendering several scenes at the same time.

Naturally an embodiment of the invention is not limited to the example embodiments mentioned above.

In particular a person skilled in the art will be able to make any variant in the choice of the interactive graphical scene coding standard.

Likewise, the number of complexity levels defined according to a particular embodiment is not limited to two and can easily be adapted to the use of elements having greater variability in terms of level of complexity of implementation and execution.

An aspect of the disclosure provides a technique that enables the rendering engine of the rendering terminal to be informed in advance of the complexity of the multimedia scene to be rendered in order to ensure increased optimization of the rendering and of the functioning of the multimedia scene reader.

Another aspect of the disclosure enables the rendering engine to make a choice among several operating modes from the very start of the loading of the initial scene, so that this choice is definitive and optimal, and independent of any modifications liable to arise subsequently in the initial scene.

Yet another aspect of the disclosure provides such a technique that does not require complex processing operations, neither on sending nor on reception of the multimedia streams.

Thus an aspect of the disclosure provides such a technique that optimizes the useful rate and does not require the transmission of a large quantity of data.

An additional aspect of the disclosure provides a technique that is compatible with the majority of the graphical animation descriptions currently standardized:

MPEG-4/BIFS ("Binary Format Scene");
the SVG language, standing for "Scalable Vector Graphics";
the SMIL language, standing for "Synchronised Multimedia Integration Language", the purpose of which consists of allowing the integration of multimedia elements within a web page;
the XML event module, the purpose of which consists of allowing a uniform integration of event listeners and associated event managers with the event interfaces of an object document model to the DOM format (standing for "Document Object Model");
HTML, etc.

Another aspect of the disclosure, in at least one of its embodiments, provides a device accelerating in a recognized fashion the rendering of multimedia scenes on terminals with small resources and processing power, such as mobile telephones for example.

Finally, an additional aspect of the disclosure enables the rendering engine, in the case of scenes referenced by a principal scene (by an interactive link for example), to use memory representations of small size, as well as fast rendering algorithms. This is particularly advantageous for devices with limited hardware and software resources.

Although one or more embodiments of the invention has been described above in relation to a limited number of embodiments, a person skilled in the art, from a reading of the present description, will understand that other embodiments can be imagined without departing from the scope of the present invention.

The invention claimed is:

1. A method, comprising:
   receiving, in a signal, a description of a multimedia scene comprising a plurality of animated objects;
   receiving, in a preamble of the multimedia scene, optimization information associated with the description of the multimedia scene, the optimization information in the preamble of the multimedia scene including a first rendering mode selected by an author of the multimedia scene from a plurality of predefined rendering modes, wherein each of the predefined rendering modes corresponds to a different scene rendering algorithm;
   receiving, in the multimedia scene, optimization information associated with one or more specific objects of the multimedia scene, where the optimization information associated with the one or more specific objects of the multimedia scene unambiguously identifies the one or more of the objects of the multimedia scene to which the optimization information associated with the one or more specific objects of the multimedia scene applies, and where the optimization information in the multimedia scene is a second rendering mode selected by the author of the multimedia scene from the plurality of predefined rendering modes each corresponding to the different scene rendering algorithm;
   selecting a scene rendering algorithm from a set of at least two available scene rendering algorithms based on the received optimization information in the multimedia scene and in the preamble of the multimedia scene, wherein the scene rendering algorithm is selected according to at least one criterion for optimization of an allocation of resources used for implementing the scene rendering algorithm by:
      identifying the first rendering mode included in the preamble of the multimedia scene,
      selecting a first one of the scene rendering algorithms corresponding to the first rendering mode,
      identifying the second rendering mode included in the multimedia scene, and
      selecting a second one of the scene rendering algorithms corresponding to the second rendering mode; and
   rendering the one or more specific objects of the multimedia scene using the second one of the scene rendering algorithms corresponding to the second rendering mode selected by the author, and rendering a remaining portion of the multimedia scene using the first one of the scene rendering algorithms corresponding to the first rendering mode selected by the author;
   wherein the description of the multimedia scene includes a general structure of the multimedia scene, where the general structure of the multimedia scene includes a header segment and an additional data segment;
   wherein the header segment includes the optimization information associated with the description of the multimedia scene;
   wherein the additional data segment includes a plurality of object segments each associated with one or more of the specific objects of the multimedia scene, as well as a plurality of optimization information segments separate from the header segment each associated with a specific object of the multimedia scene.

2. The method according to claim 1, wherein the optimization information allows a parameterizing of at least one characteristic of the selected scene rendering algorithm.

3. The method according to claim 1, wherein the optimization information is an item of binary information, representing either a simple complexity level or a complex complexity level.

4. The method according to claim 1, wherein the optimization information comprises numerical information representing several complexity levels.

5. The method according to claim 3, wherein the optimization information associated with the description of the multimedia scene indicates the complex complexity level when the multimedia scene uses a temporal rendering control for at least one of the plurality of animated objects.

6. The method according to claim 1, wherein the multimedia scene is coded in SVG/LASeR.

7. The method according to claim 1, wherein the optimization information includes an item of information on characteristics of inclusion in the multimedia scene of at least part of a second multimedia scene, the information on the inclusion characteristics being intended for a scene rendering engine of a terminal.

8. The method according to claim 7, wherein the multimedia scene makes reference to the second multimedia scene by way of an interactive link, such that the optimization information of the multimedia scene enables the scene rendering engine to operate as if the second multimedia scene is included in the multimedia scene.

9. The method according to claim 1, further comprising avoiding use of a specific function for rendering the multimedia scene, based on the optimization information received in the preamble of the signal.

10. The method according to claim 1, wherein a plurality of attributes define an animation of one of the plurality of animated objects, and the optimization information received in the preamble of the signal prevents use of at least one of the plurality of attributes defining the animation of the one of the plurality of animated objects.

11. The method according to claim 1, wherein one or more of the optimization information associated with the description of the multimedia scene and the optimization information associated with one or more specific objects of the multimedia scene enable a rendering engine to know whether temporal attributes concerning an animation of the one or more specific objects of the multimedia scene are not used.

12. The method according to claim 1, wherein the author inserts the optimization information including the first rendering mode into the preamble of the multimedia scene for use by a terminal rendering the multimedia scene in selecting the first one of the scene rendering algorithms corresponding to the first rendering mode for rendering the multimedia scene.

13. The method according to claim 12, wherein the first rendering mode selected by the author of the multimedia scene results in the terminal definitively selecting the first one of the scene rendering algorithms for rendering the multimedia scene upon a loading of the multimedia scene, such that the first one of the scene rendering algorithms is selected by the terminal independently of any modifications capable of arising subsequently in the multimedia scene.

14. A computer program product embodied on a non-transitory computer readable storage medium, comprising:
   computer code for receiving, in a signal, a description of a multimedia scene comprising a plurality of animated objects;
   computer code for receiving, in a preamble of the multimedia scene, optimization information associated with the description of the multimedia scene, the optimization information in the preamble of the multimedia scene including a first rendering mode selected by an author of the multimedia scene from a plurality of predefined rendering modes, wherein each of the predefined rendering modes corresponds to a different scene rendering algorithm;

computer code for receiving, in the multimedia scene, optimization information associated with one or more specific objects of the multimedia scene, where the optimization information associated with the one or more specific objects of the multimedia scene unambiguously identifies the one or more of the objects of the multimedia scene to which the optimization information associated with the one or more specific objects of the multimedia scene applies, and where the optimization information in the multimedia scene is a second rendering mode selected by the author of the multimedia scene from the plurality of predefined rendering modes each corresponding to the different scene rendering algorithm;

computer code for selecting a scene rendering algorithm from a set of at least two available scene rendering algorithms based on the received optimization information in the multimedia scene and in the preamble of the multimedia scene, wherein the scene rendering algorithm is selected according to at least one criterion for optimization of an allocation of resources used for implementing the scene rendering algorithm by:
identifying the first rendering mode included in the preamble of the multimedia scene,
selecting a first one of the scene rendering algorithms corresponding to the first rendering mode,
identifying the second rendering mode included in the multimedia scene, and
selecting a second one of the scene rendering algorithms corresponding to the second rendering mode; and computer code for rendering the one or more specific objects of the multimedia scene using the second one of the scene rendering algorithms corresponding to the second rendering mode selected by the author, and rendering a remaining portion of the multimedia scene using the first one of the scene rendering algorithms corresponding to the first rendering mode selected by the author;

wherein the description of the multimedia scene includes a general structure of the multimedia scene, where the general structure of the multimedia scene includes a header segment and an additional data segment;

wherein the header segment includes the optimization information associated with the description of the multimedia scene;

wherein the additional data segment includes a plurality of object segments each associated with one or more of the specific objects of the multimedia scene, as well as a plurality of optimization information segments separate from the header segment each associated with a specific object of the multimedia scene.

15. A method, comprising:
transmitting, in a signal, utilizing a processor, a description of a multimedia scene comprising a plurality of animated objects;
transmitting, in a preamble of the multimedia scene, optimization information associated with the description of the multimedia scene, the optimization information in the preamble of the multimedia scene including a first rendering mode selected by an author of the multimedia scene from a plurality of predefined rendering modes, wherein each of the predefined rendering modes corresponds to a different scene rendering algorithm;

transmitting, in the multimedia scene, optimization information associated with one or more specific objects of the multimedia scene, where the optimization information associated with the one or more specific objects of the multimedia scene unambiguously identifies the one or more of the objects of the multimedia scene to which the optimization information associated with the one or more specific objects of the multimedia scene applies, and where the optimization information in the multimedia scene is a second rendering mode selected by the author of the multimedia scene from the plurality of predefined rendering modes each corresponding to the different scene rendering algorithm;

wherein a scene rendering algorithm is selected from a set of at least two available scene rendering algorithms based on the transmitted optimization information in the multimedia scene and in the preamble of the multimedia scene, wherein the scene rendering algorithm is selected according to at least one criterion for optimization of a resource allocation used for implementing the scene rendering algorithm by:
identifying the first rendering mode included in the preamble of the multimedia scene,
selecting a first one of the scene rendering algorithms corresponding to the first rendering mode,
identifying the second rendering mode included in the multimedia scene, and
selecting a second one of the scene rendering algorithms corresponding to the second rendering mode; and wherein the one or more specific objects of the multimedia scene are capable of being rendered using the second one of the scene rendering algorithms corresponding to the second rendering mode selected by the author, and a remaining portion of the multimedia scene is capable of being rendered using the first one of the scene rendering algorithms corresponding to the first rendering mode selected by the author;

wherein the description of the multimedia scene includes a general structure of the multimedia scene, where the general structure of the multimedia scene includes a header segment and an additional data segment;

wherein the header segment includes the optimization information associated with the description of the multimedia scene;

wherein the additional data segment includes a plurality of object segments each associated with one or more of the specific objects of the multimedia scene, as well as a plurality of optimization information segments separate from the header segment each associated with a specific object of the multimedia scene.

16. A radio communication terminal, comprising:
means for receiving, in a signal, a description of a multimedia scene comprising a plurality of animated objects;
means for receiving, in a preamble of the multimedia scene, optimization information associated with the description of the multimedia scene, the optimization information in the preamble of the multimedia scene including a first rendering mode selected by an author of the multimedia scene from a plurality of predefined rendering modes, wherein each of the predefined rendering modes corresponds to a different scene rendering algorithm;
means for receiving, in the multimedia scene, optimization information associated with one or more specific objects of the multimedia scene, where the optimization information associated with the one or more specific objects of the multimedia scene unambiguously identifies the one or more of the objects of the multimedia scene to which the optimization information associated with the one or more specific objects of the multimedia scene applies, and where the optimization information in the multimedia scene is a second rendering mode selected by the author of the multimedia scene from the plurality of predefined rendering modes each corresponding to the different scene rendering algorithm;

means for selecting a scene rendering algorithm from a set of at least two available scene rendering algorithms based on the received optimization information in the multimedia scene and in the preamble of the multimedia scene, wherein the scene rendering algorithm is selected according to at least one criterion for optimization of a resource allocation used for implementing the scene rendering algorithm by:
  identifying the first rendering mode included in the preamble of the multimedia scene,
  selecting a first one of the scene rendering algorithms corresponding to the first rendering mode,
  identifying the second rendering mode included in the multimedia scene, and
  selecting a second one of the scene rendering algorithms corresponding to the second rendering mode; and means for rendering the one or more specific objects of the multimedia scene using the second one of the scene rendering algorithms corresponding to the second rendering mode selected by the author, and rendering a remaining portion of the multimedia scene using the first one of the scene rendering algorithms corresponding to the first rendering mode selected by the author;

wherein the description of the multimedia scene includes a general structure of the multimedia scene, where the general structure of the multimedia scene includes a header segment and an additional data segment;

wherein the header segment includes the optimization information associated with the description of the multimedia scene;

wherein the additional data segment includes a plurality of object segments each associated with one or more of the specific objects of the multimedia scene, as well as a plurality of optimization information segments separate from the header segment each associated with a specific object of the multimedia scene.

17. A method, comprising:
receiving, in a preamble of a multimedia scene, optimization information associated with a description of the multimedia scene, the optimization information in the preamble of the multimedia scene including a first rendering mode selected by an author of the multimedia scene from a plurality of predefined rendering modes, wherein each of the predefined rendering modes corresponds to a different scene rendering algorithm;
receiving, in the multimedia scene, optimization information associated with one or more specific objects of the multimedia scene, where the optimization information associated with the one or more specific objects of the multimedia scene unambiguously identifies the one or more of the objects of the multimedia scene to which the optimization information associated with the one or more specific objects of the multimedia scene applies, and where the optimization information in the multimedia scene is a second rendering mode selected by the author of the multimedia scene from the plurality of predefined rendering modes each corresponding to the different scene rendering algorithm;
reading the optimization information;
controlling capacities of a terminal and selecting a scene rendering algorithm from a set of at least two available scene rendering algorithms based on the received optimization information in the multimedia scene and in the preamble of the multimedia scene, wherein the scene rendering algorithm is selected according to at least one criterion for optimization of a resource allocation used for implementing the scene rendering algorithm by:
  identifying the first rendering mode included in the preamble of the multimedia scene,
  selecting a first one of the scene rendering algorithms corresponding to the first rendering mode,
  identifying the second rendering mode included in the multimedia scene, and
  selecting a second one of the scene rendering algorithms corresponding to the second rendering mode; and
rendering the one or more specific objects of the multimedia scene using the second one of the scene rendering algorithms corresponding to the second rendering mode selected by the author, and rendering a remaining portion of the multimedia scene using the first one of the scene rendering algorithms corresponding to the first rendering mode selected by the author;
wherein the description of the multimedia scene includes a general structure of the multimedia scene, where the general structure of the multimedia scene includes a header segment and an additional data segment;
wherein the header segment includes the optimization information associated with the description of the multimedia scene;
wherein the additional data segment includes a plurality of object segments each associated with one or more of the specific objects of the multimedia scene, as well as a plurality of optimization information segments separate from the header segment each associated with a specific object of the multimedia scene.

18. A computer program product embodied on a non-transitory computer readable storage medium, comprising:
computer code for receiving, in a preamble of a multimedia scene, optimization information associated with a description of the multimedia scene, the optimization information in the preamble of the multimedia scene including a first rendering mode selected by an author of the multimedia scene from a plurality of predefined rendering modes, wherein each of the predefined rendering modes corresponds to a different scene rendering algorithm;
computer code for receiving, in the multimedia scene, optimization information associated with one or more specific objects of the multimedia scene, where the optimization information associated with the one or more specific objects of the multimedia scene unambiguously identifies the one or more of the objects of the multimedia scene to which the optimization information associated with the one or more specific objects of the multimedia scene applies, and where the optimization information in the multimedia scene is a second rendering mode selected by the author of the multimedia scene from the plurality of predefined rendering modes each corresponding to the different scene rendering algorithm;
computer code for reading the optimization information;
computer code for controlling capacities of a terminal and selecting a scene rendering algorithm from a set of at least two available scene rendering algorithms based on the received optimization information in the multimedia scene and in the preamble of the multimedia scene, wherein the scene rendering algorithm is selected according to at least one criterion for optimization of a resource allocation used for implementing the scene rendering algorithm by:
  identifying the first rendering mode included in the preamble of the multimedia scene,
  selecting a first one of the scene rendering algorithms corresponding to the first rendering mode,
  identifying the second rendering mode included in the multimedia scene, and
  selecting a second one of the scene rendering algorithms corresponding to the second rendering mode; and
computer code for rendering the one or more specific objects of the multimedia scene using the second one of the scene rendering algorithms corresponding to the second rendering mode selected by the author, and rendering a remaining portion of the multimedia scene using the first one of the scene rendering algorithms corresponding to the first rendering mode selected by the author;
wherein the description of the multimedia scene includes a general structure of the multimedia scene, where the general structure of the multimedia scene includes a header segment and an additional data segment;
wherein the header segment includes the optimization information associated with the description of the multimedia scene;
wherein the additional data segment includes a plurality of object segments each associated with one or more of the specific objects of the multimedia scene, as well as a plurality of optimization information segments separate from the header segment each associated with a specific object of the multimedia scene.

\* \* \* \* \*